(12) United States Patent
Ishii et al.

(10) Patent No.: US 9,645,554 B2
(45) Date of Patent: May 9, 2017

(54) PARAMETER SETTING METHOD AND PARAMETER SETTING APPARATUS FOR POSITIONING APPARATUS, AND POSITIONING APPARATUS PROVIDED WITH THE PARAMETER SETTING APPARATUS

(71) Applicant: DMG MORI CO., LTD., Nara (JP)

(72) Inventors: Shinji Ishii, Nara (JP); Yuki Terada, Nara (JP)

(73) Assignee: DMG MORI CO., LTD., Nara (JP)

( * ) Notice: Subject to any disclaimer, the term of this patent is extended or adjusted under 35 U.S.C. 154(b) by 0 days.

(21) Appl. No.: 15/085,726

(22) Filed: Mar. 30, 2016

(65) Prior Publication Data

US 2016/0291551 A1    Oct. 6, 2016

(30) Foreign Application Priority Data

Mar. 31, 2015    (JP) ................. 2015-072033

(51) Int. Cl.
*G05B 5/01*    (2006.01)
(52) U.S. Cl.
CPC ................. *G05B 5/01* (2013.01)

(58) Field of Classification Search
CPC .................................. G05B 5/01
USPC ...................... 318/619, 606, 34
See application file for complete search history.

(56) References Cited

U.S. PATENT DOCUMENTS 6,943,522 B2 * 9/2005 Nagaoka ............ G05B 19/19
318/548

FOREIGN PATENT DOCUMENTS

JP    2009101444 A    5/2009

* cited by examiner

*Primary Examiner* — David S Luo
(74) *Attorney, Agent, or Firm* — Miller, Matthias & Hull LLP

(57) ABSTRACT

A parameter setting apparatus includes a calculator calculating a first resonance frequency $\omega_{r1}$ of a structure composed of a table, a rotor of a drive motor, and an object and a second resonance frequency $\omega_{r2}$ of a structure composed of a stator of the drive motor and a base using equations given below, and a setter setting a frequency band to be removed for a first damping filter based on the calculated first resonance frequency $\omega_{r1}$ and setting a frequency band to be removed for a second damping filter based on the second resonance frequency $\omega_{r2}$.

3 Claims, 4 Drawing Sheets

PARAMETER SETTING METHOD AND PARAMETER SETTING APPARATUS FOR POSITIONING APPARATUS, AND POSITIONING APPARATUS PROVIDED WITH THE PARAMETER SETTING APPARATUS

BACKGROUND

Field of the Disclosure

The present disclosure relates to a setting method and a setting apparatus for setting a frequency band to be removed for a damping filter provided in a positioning apparatus that controls a drive motor of a rotary table device including a base, a table which is rotatably held by the base and on which an object is to be placed, and the drive motor which rotates the table with respect to the base, as well as a positioning apparatus provided with the setting apparatus.

Background of the Disclosure

For example, in the field of machine tool, the above-described positioning apparatus has been generally used for positioning control of a feed device or a rotary table. A known example of such a positioning apparatus is the one disclosed in Japanese Unexamined Patent Application Publication No. 2009-101444, which controls a biaxial unit having a trunnion structure, which is provided on a machine tool such as a 5-axis control vertical machining center. The positioning apparatus includes a function generator, a position controller, a speed controller, and a torque/current controller, and controls a motor rotating the trunnion in accordance with a signal output from the torque/current controller.

Specifically, in this positioning apparatus, a position command is generated based on an NC command output from an NC device by the function generator, a speed command is generated based on the generated position command and a position gain by the position controller, a torque command is generated based on the generated speed command and a speed gain by the speed controller, a drive torque signal is generated based on the generated torque command and a torque gain by the torque/current controller, and a current corresponding to the signal is supplied to the motor, whereby the motor is driven.

Further, the positioning apparatus has an angle error estimator provided therein which calculates an angle error caused by elastic deformation of the trunnion and compensates for the angle error; the angle error estimator calculates the angle error $\Delta\theta$ by the following equation:

$$\Delta\theta = (Tm - Jm \cdot \alpha)/K\theta R,$$

where Jm is an inertia of the turning shaft portion or the bearing, Tm is a torque command output from the speed controller, $\alpha$ is a rotational angular acceleration, and $K\theta R$ is a torsional rigidity coefficient.

SUMMARY OF THE DISCLOSURE

By the way, in the above-described conventional positioning apparatus, when a position command is generated in the function generator, a rapid feed time constant is used in the case of rapid feed movement. Further, a position gain, a speed gain, and a torque gain are used in the position controller, the speed controller, and the torque/current controller, respectively. In order to achieve stable control, the control parameters such as the rapid feed time constant, the position gain, the speed gain, and the torque gain have to be set properly.

Further, although not disclosed in Japanese Unexamined Patent Application Publication No. 2009-101444, generally, a damping filter is provided between the speed controller and the torque/current controller, and the torque command output from the speed controller passes through the damping filter and thereby a vibration component in a specific frequency band is removed, and then the torque command is input into the torque/current controller. The frequency band to be removed that is set for the damping filter is also a control parameter, and this has to be set properly in order to achieve stable control.

Accordingly, the above-mentioned control parameters are hitherto determined in advance in accordance with machining specifications set for the machine tool, such as maximum size and maximum weight of workpiece, maximum machining load, etc., by the machine tool manufacturer so that appropriate machining is achieved.

However, in recent years, users have handled various workpieces having various materials and shapes, and this causes problems in the above-described positioning control. For example, when a user machines a workpiece having a very thin thickness, a problem occurs that the workpiece vibrates when being moved and this vibration (external disturbance vibration) vibrates the positioning control system.

In order to solve this problem, the frequency band to be removed by the damping filter, which is a parameter for removing external disturbance vibration, of the above-described control parameters has to be reset to a proper value corresponding to the handled workpiece. However, conventionally, when the frequency band to be removed by the damping filter is reset, there is no choice but to relying on a trail-and-error method, that is, a method in which the frequency band to be removed is changed little by little and the operation is tested. Therefore, there is a problem that the above-described problem cannot be solved quickly.

The present disclosure has been achieved in view of the above-described circumstances, and an object thereof is to provide a parameter setting method and a parameter setting apparatus for a positioning apparatus which allow the frequency band to be removed by the damping filter to be reset to a proper value corresponding to a handled object quickly without using a trial-and-error method, as well as a positioning apparatus provided with the parameter setting apparatus.

The present method disclosure, for solving the above-described problems, relates to a control parameter setting method for setting a frequency band to be removed for a damping filter provided in a positioning apparatus controlling a drive motor of a rotary table device, the rotary table device including a base, a table for placing an object thereon, the table being rotatably held by the base, and the drive motor rotating the table with respect to the base, the control parameter setting method including:

calculating a first resonance frequency $\omega r1$ [rad/s] of a structure composed of the table, a rotor of the drive motor, and the object and a second resonance frequency $\omega r2$ [rad/s] of a structure composed of a stator of the drive motor and the base using equations:

$$\omega r1 = (Kj((1/Jr + Jt)) + (1/Jj)))^{1/2}, \text{ and}$$

$$\omega r2 = (Ks((1/Jb) + (1/Js)))^{1/2}; \text{ and}$$

setting the frequency band to be removed for a first damping filter provided in the positioning apparatus based on the calculated first resonance frequency $\omega r1$ and setting the frequency band to be removed for a second damping filter provided in the positioning apparatus based on the calculated second resonance frequency ωr2.

Further, the present apparatus relates to a control parameter setting apparatus for setting a frequency band to be removed for a damping filter provided in a positioning apparatus controlling a drive motor of a rotary table device, the rotary table device including a base, a table for placing an object thereon, the table being rotatably held by the base, and the drive motor rotating the table with respect to the base, the control parameter setting apparatus including:

a calculator calculating a first resonance frequency ωr1 of a structure composed of the table, a rotor of the drive motor, and the object and a second resonance frequency ωr2 of a structure composed of a stator of the drive motor and the base using the above equations; and a setter setting the frequency band to be removed for a first damping filter provided in the positioning apparatus based on the first resonance frequency ωr1 calculated by the calculator and setting the frequency to be removed for a second damping filter provided in the positioning apparatus based on the second resonance frequency ωr2 calculated by the calculator.

Note that, in the above equations, $J_r$ is an inertia [kg·m²] of the rotor of the drive motor, $J_t$ is an inertia [kg·m²] of the table, $J_j$ is an inertia [kg·m²] of the object, $J_b$ is an inertia [kg·m²] of the base, $J_s$ is an inertia [kg·m²] of the stator of the drive motor, $K_j$ is a torsional rigidity [N·m/rad] of the object, and $K_s$ is a torsional rigidity [N·m/rad] of the stator of the drive motor.

Further, this control parameter setting apparatus can carry out the control parameter setting method of the present disclosure appropriately. Specifically, in the control parameter setting apparatus, first, a first resonance frequency $\omega_{r1}$ of a structure composed of the table, the rotor of the drive motor, and the object and a second resonance frequency $\omega_{r2}$ of a structure composed of the stator of the drive motor and the base are calculated using the above equations by the calculator.

Although details will be described later, as for the rotary table device having the above-described structure, the first resonance frequency $\omega_{r1}$ and the second resonance frequency $\omega_{r2}$ can be derived using the above equations. The inertia $J_r$ of the rotor and the inertia $J_s$ of the stator of the drive motor, the inertia $J_t$ of the table, the inertia $J_j$ of the object, the inertia h of the base, the torsional rigidity $K_j$ of the object, and the torsional rigidity $K_s$ of the stator of the drive motor can be calculated in advance based on design data. Therefore, the first resonance frequency $\omega_{r1}$ and the second resonance frequency $\omega_{r2}$ can be theoretically calculated without relying on the trial-and-error method.

Subsequently, in the setter, the frequency band to be removed by a first damping filter provided in the positioning apparatus is set based on the first resonance frequency $\omega_{r1}$ calculated by the calculator, that is, the frequency band to be removed by the first damping filter is set to have a predetermined width with the first resonance frequency $\omega_{r1}$ at the middle thereof and, similarly, the frequency band to be removed by a second damping filter provided in the positioning apparatus is set based on the second resonance frequency $\omega_{r2}$ calculated by the calculator, that is, the frequency band to be removed by the second damping filter is set to have a predetermined width with the second resonance frequency $\omega_{r2}$ at the middle thereof.

Thus, according to the present disclosure, the frequency band to be removed by the first damping filter for removing, from the control signal of the positioning apparatus, the first resonance (frequency $\omega_{r1}$) that occurs on the structure composed of the table, the rotor of the drive motor, and the object and the frequency band to be removed by the second damping filter for removing, from the control signal of the positioning apparatus, the second resonance (frequency $\omega_{r2}$) that occurs on the structure composed of the stator of the drive motor and the base can be theoretically set without relying on the conventional trial-and-error method. Therefore, the frequency bands to be removed can be set to proper values corresponding to the handled object quickly.

Further, according to the positioning apparatus provided with the above-described control parameter setting apparatus, the frequency bands to be removed by the damping filters thereof can be theoretically set without relying on the conventional trial-and-error method and can be set to proper values corresponding to the handled object quickly. Therefore, the rotary table device can be controlled properly corresponding to the handled object.

As described above, according to the present disclosure, the frequency band to be removed by the first damping filter for removing, from control signal of the positioning apparatus, the first resonance (frequency $\omega_{r1}$) that occurs on the structure composed of the table, the rotor of the drive motor, and the object and the frequency band to be removed by the second damping filter for removing, from the control signal of the positioning apparatus, the second resonance (frequency $\omega_{r2}$) that occurs on the structure composed of stator of the drive motor and the base can be theoretically set without relying on the conventional trial-and-error method. Therefore, the frequency bands to be removed can be set to proper values corresponding to the handled object quickly.

Further, when this control parameter setting apparatus is provided in a positioning apparatus, the frequency bands to be removed by the damping filters of the positioning apparatus can be theoretically set without relying on the conventional trial-and-error method and can be set to proper values corresponding to the handled object quickly. Therefore, the rotary table device as the control target can be controlled properly corresponding to the handled object.

BRIEF DESCRIPTION OF THE DRAWINGS

For a more complete understanding of the disclosed methods and apparatus, reference should be made to the embodiment illustrated in greater detail on the accompanying drawings, wherein.

DETAILED DESCRIPTION

Specific embodiments of the present disclosure will be described below with reference to the drawings.

Figure 1:
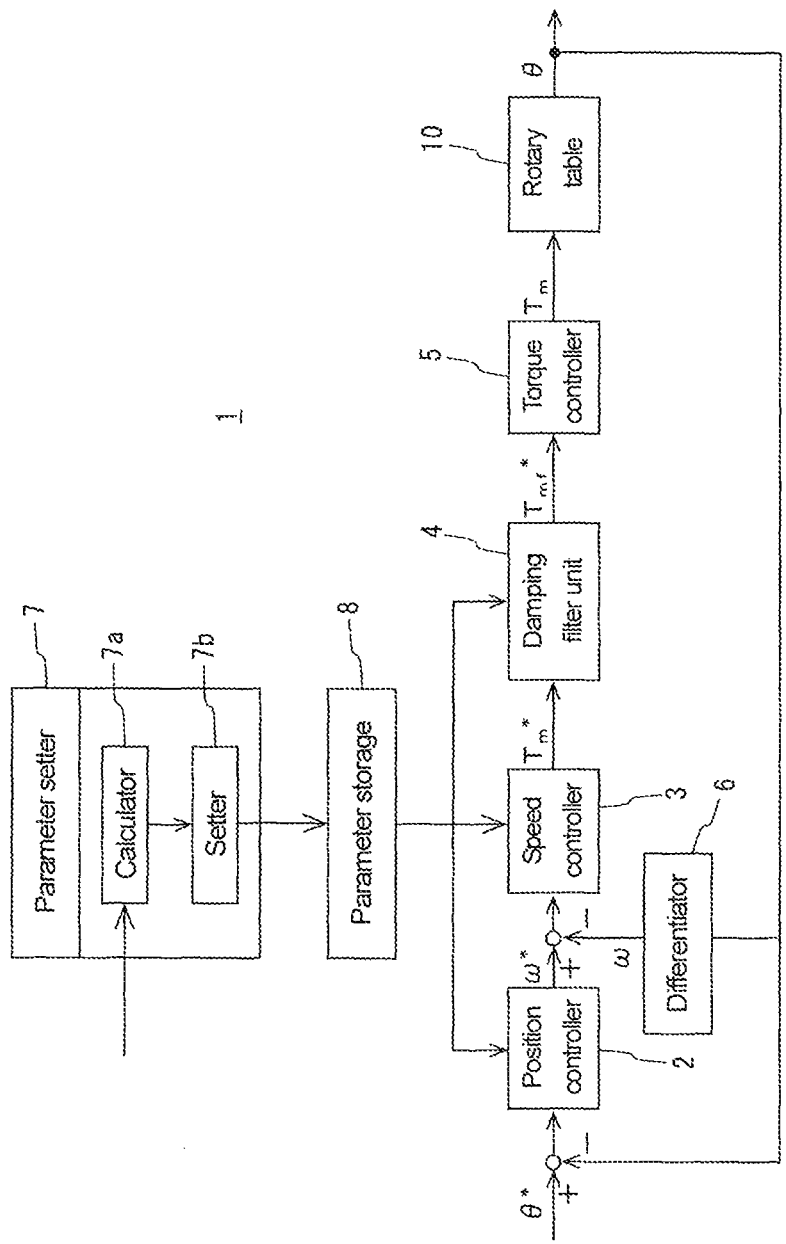
FIG. 1 is a block diagram showing a schematic configuration of a positioning apparatus according to an embodiment of the present disclosure.
Figure 3:
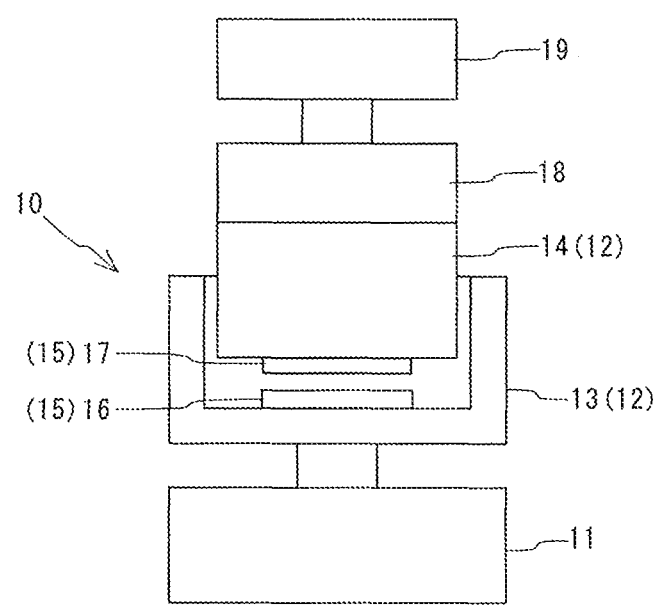
FIG. 3 is a schematic diagram showing a rotary table device to be controlled by the positioning apparatus in the embodiment.

Hereinafter, a specific embodiment of the present disclosure will be described with reference to the drawings. FIG. 1 is a block diagram showing a positioning apparatus according to an embodiment of the present disclosure, and FIG. 3 is a schematic diagram showing a model of a rotary table device to be controlled by the positioning apparatus. Note that FIG. 3 is a mere abstract conceptual diagram and does not show a specific structure of the rotary table device.

As shown in FIG. 1, the positioning apparatus 1 in this embodiment includes a position controller 2, a speed controller 3, a damping filter unit 4, a torque controller 5, a differentiator 6, a parameter setter 7, and a parameter storage 8.

The position controller 2 receives input of a position command $\theta^*$, which is, for example, generated in an NC processor and output therefrom, and executes a processing of generating a speed command $\omega^*$ based on a deviation between the position command $\theta^*$ and a present position signal $\theta$ output from a position detector 15 of the rotary table device 10, which will be described later, as well as a position gain and outputting the generated speed command $\omega^*$.

The speed controller 3 executes a processing of generating a torque command $T_m^*$ based on a deviation between the speed command $\omega^*$, which is input from the position controller 2 into the speed controller 3, and a present speed signal $\omega$ that is output from the position detector 15, differentiated by the differentiator 6, and then output from the differentiator 6, as well as a speed gain and outputting the generated torque command $T_m^*$.

Figure 2:
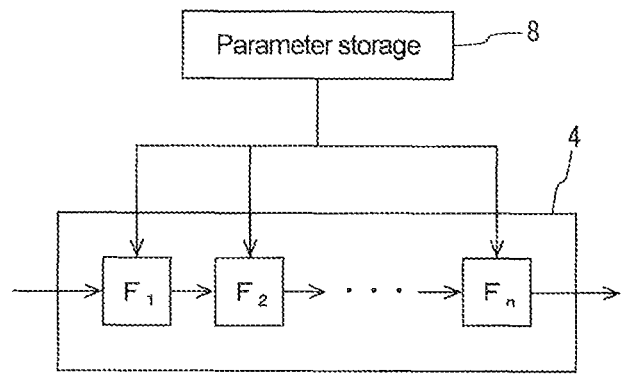
FIG. 2 is a block diagram showing a parameter storage and a damping filter unit in the embodiment.

As shown in FIG. 2, the damping filter unit 4 includes n filters including at least two filters: a first filter $F_1$ and a second filter $F_2$; each filter is composed of a notch filter. The damping filter unit 4 receives input of the torque command $T_m^*$ output from the speed controller 3 and executes a processing of removing a frequency component in a frequency band to be removed, which is set for each of the filters, from the input torque command $T_m^*$ and outputting the torque command after removal $T_{mf}^*$. Note that the number of the notch filters is only required to be two or more and there is no limit to the number of the provided filters.

The torque controller 5 receives input of the filtered torque command $T_{mf}^*$ output from the damping filter unit 4 and executes a processing of generating a drive torque signal $T_m$ for a motor 12 of the rotary table device 10 based on the input torque command $T_{mf}^*$ as well as a torque gain and outputting the generated signal.

Further, the parameter storage 8 is a functional unit storing therein control parameters used in the positioning apparatus 1. The position gain, the speed gain, the frequency bands to be removed by the filters $F_n$, and the torque gain are stored as control parameters in the parameter storage 8, and these control parameters are read out and used by the corresponding position controller 2, speed controller 3, filters $F_n$, and torque controller 5, respectively. Note that these control parameters can be stored into the parameter storage 8 from the outside and the frequency bands to be removed are updated by the parameter setter 7. A specific processing in the parameter setter 7 will be described later.

As shown in FIG. 3, the rotary table device 10 in this embodiment includes a table base 11 as the base, a table 18 disposed on the table base 11 and provided to be rotatable about a vertical axis of rotation, and the motor 12 that rotates the table 18 about the axis of rotation. The motor 12 is composed of a stator 13 fixed to the table base 11 and a rotor 14 arranged in the stator 13 in a state of being fixed to the table 18. Further, a rotational position of the rotor 14 with respect to the axis of rotation is detected by the position detector 15 that is composed of a part 17 provided on the lower surface of the rotor 14 and a part 16 provided on the stator 13 to face the part 17. Note that a jig or workpiece (hereinafter, simply referred to as "workpiece") 19 as the object is attached to the table 18.

Thus, according to this positioning apparatus 1, first, a speed command $\omega^*$ is generated based on a deviation between the position command $\theta^*$ input into the position controller 2 as appropriate and the present position signal $\theta$ as well as the position gain in the position controller 2, and then a torque command $T_m^*$ is generated based on a deviation of the speed command $\omega^*$ and the present speed signal $\omega$ as well as the speed gain in the speed controller 3.

Subsequently, the generated torque command $T_m^*$ passes through the damping filter unit 4, and thereby vibration components in the frequency bands to be removed set for the filters are removed from the torque command $T_m^*$ and then the torque command after removal $T_{mf}^*$ is input into the torque controller 5. Subsequently, a drive torque signal $T_m$ for the motor 12 is generated based on the torque command $T_{mf}^*$ and the torque gain in the torque controller 5, and a current corresponding to the drive torque signal $T_m$ is supplied to the motor 12 and thereby the motor 12 is driven. Consequently, the table 18 is rotationally moved by the thus-controlled motor 12.

The parameter setter 7 includes a calculator 7a calculating a first resonance frequency $\omega r1$ of a structure composed of the table 18, the rotor 14 of the motor 12, and the workpiece 19 (hereinafter, referred to as "upper structure") and a second resonance frequency $\omega r2$ of a structure composed of the stator 13 of the motor 12 and the table base 11 (hereinafter, referred to as "lower structure") using equations given below, and a setter 7b setting the frequency band to be removed for the first filter F1 based on the first resonance frequency $\omega r1$ calculated by the calculator 7a and setting the frequency band to be removed for the second filter F2 based on the second resonance frequency $\omega r2$ calculated by the calculator 7a.

$$\omega r1=(Kj((1/Jr+Jt))+(1/Jj)))^{1/2}$$

$$\omega r2=(Ks((1/Jb)+(1/Js)))^{1/2}$$

Note that $J_r$ is an inertia [kg·m²] of the rotor 14, $J_t$ is an inertia [kg·m²] of the table 18, $J_t$ is an inertia [kg·m²] of the workpiece 19, $J_b$ is an inertia [kg·m²] of the table base 11, $J_s$ is an inertia [kg·m²] of the stator 13, $K_j$ is a torsional rigidity [N·m/rad] of the workpiece 19, and $K_s$ is a torsional rigidity [N·m/rad] of the stator 13. These values can be calculated in advance based on design data and may be input into the calculator 7a from the outside as needed. Alternatively, the values except the inertia $J_j$ and the torsional rigidity $K_j$ of the workpiece 19, i.e., the inertia $J_r$ of the rotor 14, the inertia $J_t$ of the table 18, the inertia $J_b$ of the table base 11, the inertia $J_s$ of the stator 13, and the torsional rigidity $K_s$ of the stator 13 may be stored into the calculator 7a in advance and held in the calculator 7a because these values are specific to the rotary table device 10.

Figure 4:
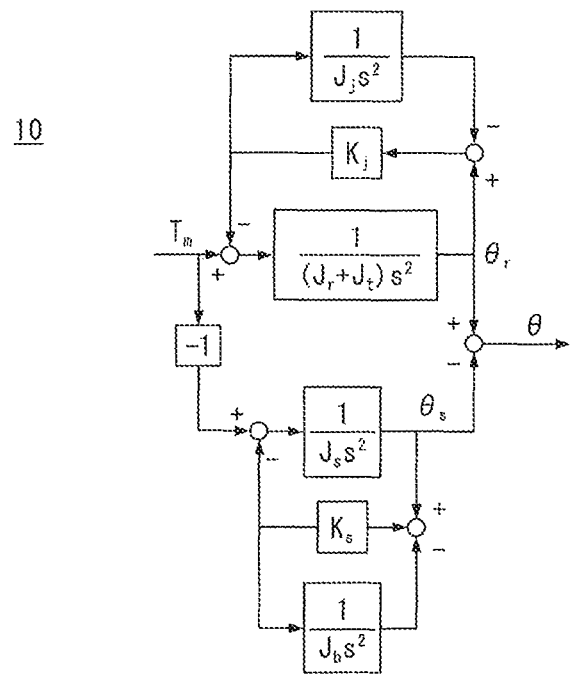
FIG. 4 is a control block diagram of the rotary table device in the embodiment.

The rotary table device 10 having the typical structure modeled in FIG. 3 has a structure in which the table base 11 and the table 18 are separated from each other, the stator 13 and the rotor 14 of the motor 12 are separated from each other, the table base 11 and the stator 13 are coupled to each other, the rotor 14 is coupled to the table 18, and the workpiece 19 is coupled to the table 18. Therefore, the rotary table device 10 having such a structure is recognized as a device consisting of two structures, i.e., the upper structure composed of the table 18, the rotor 14, and the workpiece 19 and the lower structure composed of the stator 13 and the table base 11. According to the study by the inventors, the control model of the rotary table device 10 can be represented as a block diagram as shown in FIG. 4.

Figure 5:
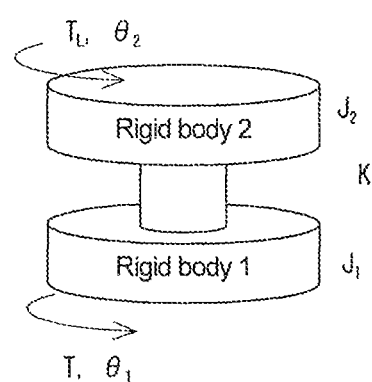
FIG. 5 is an explanatory illustration showing a vibration model of a two-inertia system.

Each of the upper structure and the lower structure can be interpreted as a vibration model of a two-inertia system as shown in FIG. 5. That is, in the upper structure, the table 18 and the rotor 14 correspond to the rigid body 1 and the workpiece 19 corresponds to the rigid body 2. Therefore, the followings hold:

$J1=Jr+Jt$, $J2=Jj$, and $K=Kj$.

On the other hand, in the lower structure, the table base 11 corresponds to the rigid body 1 and the stator 13 corresponds to the rigid body 2. Therefore, the followings hold:

$J1=Jb$, $J2=Js$, and $K=Ks$.

Such a two-inertia system model satisfies the equations based on the equation of motion for a rotating system:

$J1(d2\theta1/dt2)=T-T_L$, $J2(d2\theta2/dt2)=T_L$, and $T_L=K(\theta_1-\theta_2)$.

When the Laplace transform is applied to these equations, the followings are obtained:

$\theta_1=(T-T_L)/(J_1s^2)$, $\theta_2=T_L/(J_2s^2)$, and $T_L=K(\theta_1-\theta_2)$.

Figure 6:
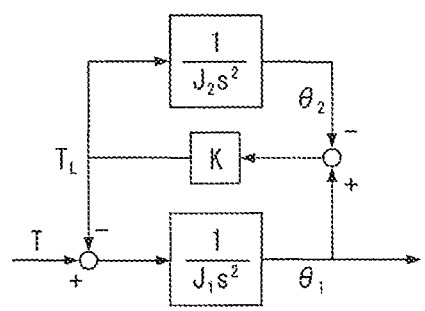
FIG. 6 is a control block diagram of the vibration model of the two-inertia system.

Therefore, the two-inertia system model shown in FIG. 5 can be represented by a block diagram as shown in FIG. 6; therefore, as described above, the rotary table device 10 consisting of the upper structure and the lower structure can be represented as the block diagram shown in FIG. 4.

When the relationship between θ1 and T is derived from the above equations of θ1, θ2, and TL, Equation 1 below is derived.

$$\theta_1 = \frac{1}{s^2} \cdot \frac{J_2 s^2 + K}{J_1 J_2 s^2 + K(J_1 + J_2)} T \qquad \text{[Equation 1]}$$

Equation 1 can be sequentially transformed into Equation 2, Equation 3, and Equation 4 below.

$$\theta_1 = \frac{1}{s^2} \cdot \frac{1}{J_1} \cdot \frac{s^2 + K/J_2}{s^2 + K(1/J_1 + 1/J_2)} T \qquad \text{[Equation 2]}$$

$$\theta_1 = \frac{1}{s^2} \cdot \frac{1}{J_1} \cdot \frac{K/J_2}{K(1/J_1 + 1/J_2)} \cdot \frac{K(1/J_1 + 1/J_2)}{s^2 + K(1/J_1 + 1/J_2)} \cdot \frac{s^2 + K/J_2}{K/J_2} T \qquad \text{[Equation 3]}$$

$$\theta_1 = \frac{1}{s^2} \cdot \frac{1}{J_1} \cdot \frac{1}{J_2/J_1 + 1} \cdot \frac{((K(1/J_1 + 1/J_2))^{1/2})^2}{s^2 + ((K(1/J_1 + 1/J_2))^{1/2})^2} \cdot \frac{s^2 + ((K/J_2)^{1/2})^2}{((K/J_2)^{1/2})^2} T \qquad \text{[Equation 4]}$$

Figure 7:
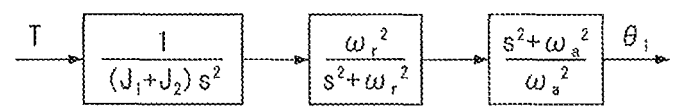
FIG. 7 is a control block diagram of the vibration model of the two-inertia system.

Equation 4 above can be eventually represented by Equation 5 below, and Equation 5 can be represented by a block diagram shown in FIG. 7.

$$\theta_1 = \frac{1}{(J_1 + J_2)s^2} \cdot \frac{\omega_r^2}{s^2 + \omega_r^2} \cdot \frac{s^2 + \omega_a^2}{\omega_a^2} T \qquad \text{[Equation 5]}$$

In Equation 5, $\omega_r$ is a resonance frequency [rad/s], $\omega_a$ is an anti-resonance frequency [rad/s], and these are represented as follows:

$\omega_r=(K((1/J_1)+(1/J_2)))^{1/2}$, and $\omega_a=(K/J_2)^{1/2}$.

"$1/(J1+J2)s2$", "$\omega r2/(s2+\omega r2)$", and "$(s2+\omega a2)/\omega a2$" in Equation 5 are terms representing the rigid-body part, the resonance part, and the anti-resonance part, respectively.

Thus, in the vibration model of the two-inertia system, the resonance frequency ωr can be calculated from the above equation.

Accordingly, when the resonance frequency of the above-described upper structure in this embodiment, i.e., the first resonance frequency, is represented by ωr1, since J1=Jr+Jt, J2=Jj, and K=Kj as described above, this ωr1 can be calculated by the following equation:

$\omega r1=(Kj((1/Jr+Jt))+(1/Jj)))^{1/2}$.

Similarly, when the resonance frequency of the lower structure, i.e., the second resonance frequency, is represented by ωr2, since J1=Jb, J2=Js, and K=Ks as described above, this ωr2 can be calculated by the following equation:

$\omega r2=(Ks((1/Jb)+(1/Js)))^{1/2}$.

Based on this inventors' finding, the parameter setter 7 in this embodiment, as described above, has a configuration in which the calculator 7a calculates the first resonance frequency $\omega_{r1}$ of the structure composed of the table 18, the rotor 14 of the motor 12, and the workpiece 19 (i.e., the upper structure) and the second resonance frequency $\omega_{r2}$ of the structure composed of the stator 13 of the motor 12 and the table base 11 (i.e., the lower structure) using the above equations.

Subsequently, in the setter 7b, the frequency band to be removed by the first filter $F_1$ is set based on the first resonance frequency $\omega_{r1}$ calculated by the calculator 7a, that is, the frequency band to be removed by the first filter $F_1$ is set to have a predetermined width with the first resonance frequency $\omega_{r1}$ at the middle thereof, and, similarly, the frequency band to be removed by the second filter $F_2$ is set to have a predetermined width with the second resonance frequency $\omega_{r2}$ at the middle thereof. Subsequently, data on the set frequency bands to be removed by the filters is stored into the parameter storage 8, in other words, the existing data stored in the parameter storage 8 is replaced and updated with the data on the set frequency bands to be removed.

Thus, according to the parameter setter 7 in this example, the frequency band to be removed by the first filter $F_1$ for removing the first resonance (frequency $\omega_{r1}$) occurring on the upper structure from the control signal (the torque command $T_m^*$ output from the speed controller 3) and the frequency band to be removed by the second filter $F_2$ for removing the second resonance (frequency $\omega_{r2}$) occurring on the lower structure from the control signal (the torque command $T_m^*$ output from the speed controller 3) can be theoretically set without relying on the conventional trial-and-error method. Therefore, they can be set to proper values corresponding to a handled object, that is, the workpiece (jig, workpiece, or the like) 19 quickly.

According to the positioning apparatus 1 in this embodiment that includes the parameter setter 7, the frequency bands to be removed by the first filter $F_1$ and the second filter $F_2$ can be theoretically set without relying on the conventional trial-and-error method and can be set to proper values corresponding to the handled workpiece 19 quickly. Therefore, the rotary table device 10 as the control target can be controlled properly corresponding to the handled workpiece 19. That is, the first resonance component occurring on the upper structure is removed from the control signal by the first filter $F_1$ and the second resonance component occurring on the lower structure is removed from the control signal by the second filter $F_2$; therefore, control in the positioning apparatus 1 can be stabilized. In particular, the first resonance component occurring on the upper structure depends on the handled workpiece 19; it is possible to properly remove the first resonance component corresponding to the workpiece 19 from the control signal.

One embodiment of the present disclosure has been described above; however, the present disclosure is not limited thereto and can be implemented in other modes.

What is claimed is:

1. A control parameter setting method for setting a frequency band to be removed for a damping filter provided in a positioning apparatus controlling a drive motor of a rotary table device, the rotary table device including a base, a table for placing an object thereon, the table being rotatably held by the base, and the drive motor rotating the table with respect to the base, the control parameter setting method comprising:

calculating a first resonance frequency $\omega_{r1}$ of a structure composed of the table, a rotor of the drive motor, and the object and a second resonance frequency $\omega_{r2}$ of a structure composed of a stator of the drive motor and the base using equations:

$\omega_{r1}=(K_j((1/J_r+J_t))+(1/J_j)))^{1/2}$, and $\omega_{r2}=(K_s((1/J_b)+(1/J_s)))^{1/2}$, where $J_r$ is an inertia of the rotor of the drive motor, $J_t$ is an inertia of the table, $J_j$ is an inertia of the object, h is an inertia of the base, $J_s$ is an inertia of the stator of the drive motor, $K_j$ is a torsional rigidity of the object, and $K_s$ is a torsional rigidity of the stator of the drive motor; and setting the frequency band to be removed for a first damping filter provided in the positioning apparatus based on the calculated first resonance frequency $\omega_{r1}$ and setting the frequency band to be removed for a second damping filter provided in the positioning apparatus based on the calculated second resonance frequency $\omega_{r2}$.

2. A control parameter setting apparatus for setting a frequency band to be removed for a damping filter provided in a positioning apparatus controlling a drive motor of a rotary table device, the rotary table device including a base, a table for placing an object thereon, the table being rotatably held by the base, and the drive motor rotating the table with respect to the base, the control parameter setting apparatus comprising:

a calculator calculating a first resonance frequency $\omega_{r1}$ of a structure composed of the table, a rotor of the drive motor, and the object and a second resonance frequency $\omega_{r2}$ of a structure composed of a stator of the drive motor and the base using equations:

$\omega_{r1}=(K_j((1/J_r+J_t))+(1/J_j)))^{1/2}$, and $\omega_{r2}=(K_s((1/J_b)+(1/J_s)))^{1/2}$, where $J_r$ is an inertia of the rotor of the drive motor, $J_t$ is an inertia of the table, $J_j$ is an inertia of the object, $J_b$ is an inertia of the base, $J_s$ is an inertia of the stator of the drive motor, $K_j$ is a torsional rigidity of the object, and $K_s$ is a torsional rigidity of the stator of the drive motor; and a setter setting the frequency band to be removed for a first damping filter provided in the positioning apparatus based on the first resonance frequency $\omega_{r1}$ calculated by the calculator and setting the frequency to be removed for a second damping filter provided in the positioning apparatus based on the second resonance frequency $\omega_{r2}$ calculated by the calculator.

3. The positioning apparatus controlling the drive motor, comprising:

the first and second damping filters, and the control parameter setting apparatus of claim 2.

* * * * *